United States Patent [19]

Langer, Jr.

[11] 4,224,181

[45] * Sep. 23, 1980

[54] ZIEGLER TYPE CATALYST SYSTEM

[75] Inventor: Arthur W. Langer, Jr., Watchung, N.J.

[73] Assignee: Exxon Research & Engineering Co., Florham Park, N.J.

[*] Notice: The portion of the term of this patent subsequent to Jun. 13, 1995, has been disclaimed.

[21] Appl. No.: 18,418

[22] Filed: Mar. 7, 1979

Related U.S. Application Data

[60] Continuation-in-part of Ser. No. 862,290, Dec. 19, 1977, abandoned, which is a division of Ser. No. 767,766, Feb. 11, 1977, Pat. No. 4,094,818.

[51] Int. Cl.$^2$ .......................... C08F 4/62; C08F 4/64; C08F 4/68; C08F 4/70
[52] U.S. Cl. .............................. 252/429 B; 526/139; 526/140; 526/141; 526/142; 526/153
[58] Field of Search ...................................... 252/429 B

[56] References Cited

U.S. PATENT DOCUMENTS

| | | | |
|---|---|---|---|
| 3,345,351 | 10/1967 | McCall et al. | 252/429 B X |
| 4,064,069 | 12/1977 | Ueno et al. | 252/429 B |
| 4,094,818 | 6/1978 | Langer | 252/429 C |
| 4,145,313 | 3/1979 | Langer | 252/429 B |

*Primary Examiner*—Patrick Garvin
*Attorney, Agent, or Firm*—Richard E. Nanfeldt

[57] ABSTRACT

A new improved Ziegler type catalyst system for alpha-olefin type polymerization includes $R'_3Y$ or $R'_2YX$ and mixtures thereof, at least one Group IVB-VIII transition metal halide and an alkyl metal compound selected from $R'_2YNR_2$ and $R'XYNR_2$, wherein Y is Al, Ga or In and at least one Lewis base. The improved catalyst system provides increased polymerization activity without significantly affecting the crystallinity of the polymer.

16 Claims, No Drawings

ZIEGLER TYPE CATALYST SYSTEM

CROSS-REFERENCE TO RELATED APPLICATIONS

The present application is a continuation-in-part application of Ser. No. 862,290, filed Dec. 19, 1977, now abandoned, which in turn is a divisional application of Ser. No. 767,766 filed Feb. 11, 1977, now U.S. Pat. No. 4,094,818.

BACKGROUND OF THE INVENTION

1. Field of the Invention

A new improved Ziegler type catalyst system for alphaolefin type polymerization includes $R'_3Y$ or $R'_2YX$ and mixtures thereof, at least one Group IVB-VIII transition metal halide, and $R'_2YNR_2$ or $R'XYNR_2$ at a concentration level of about 0.05 to about 5.0 mole per mole of $TiCl_3$, wherein X is a halide, R' is selected from the group consisting of $C_1$ to $C_{20}$ primary alkyl, secondary alkyl, tertiary alkyl, neopentyl alkyl, branched alkyl, naphthenic, or aralkyl groups, R is selected from the group consisting of $C_3$ to $C_{20}$ bulky alkyl, cycloalkyl aryl or substituted aryl groups, or a cyclic amine group, and Y is selected from the group consisting of aluminum, gallium or indium. The improved catalyst system provides increased polymerization activity without significantly affecting the crystallinity of the polymer because the alkyl metal compound selectively removes $R'AlX_2$ from the surface of $TiCl_3$ where it is believed to normally act as a poison, wherein the $R'AlX_2$ is a by-product formed in initial catalyst manufacture and during the course of polymerization which tends to promote the formation of polymers having a low degree of crystallinity.

2. Description of the Prior Art

There is extensive art on the polymerization of ethylene and higher alpha-olefins, including dienes, using Ziegler-type catalysts containing either alkyl metals or alkyl metals in which an alkyl group has been replaced by X, OR, SR, $NR_2$, etc., in combination with a transition metal compound of Groups IVB-VIII, where X=halide and R=$C_1$ to $C_{20}$ hydrocarbyl substituent.

For the commercial stereospecific polymerization of propylene and higher alpha olefins, only a few alkyl metal compounds have been found effective in combination with titanium or vanadium chlorides. Commercially, only $R_2AlCl$ or $R_3Al$ are used together with a crystalline form of $TiCl_3$ or $TiCl_3.nAlCl_3$. Mixtures of $R_3Al$ and $R_2AlCl$ and $RAlCl_2$ are made in situ and have been disclosed as catalyst components frequently in the art. R is preferably ethyl (Et) or isobutyl; n=0.01 to 0.75.

It is also well known that, in propylene polymerizations using $TiCl_3$, catalyst activity decreases sharply in the series $AlEt_3$, $Et_2AlCl$, $EtAlCl_2$ (Malatesta, *Can. J. Chem.* 37. 1176 (1959) and Boldyreva et. al., *Vysokomolekul. Soedin* 1, 900 (1959); C.A. 55, 2454a (1961). When the chloride in $Et_2AlCl$ is replaced by OR, SR, SeR or $NR_2$, activity and polymer isotacticity usually drop drastically (Danusso, *J. Polymer Sci.* C4, 1497 (1964)).

In the present inventor's research, $Et_2AlOEt$ and $Et_2AlNEt_2$ were found to have some activity with $TiCl_3$, but the polypropylene obtained was nearly atactic (Langer, Seventh Biennial Polymer Symposium, Florida, Dec. 8, 1974). Therefore, the art teaches that both activity and polymer isotacticity are extremely low when $R_2AlNR_2$ (aluminum amide) compounds are used as replacements for conventional alkyl metal cocatalyst components.

This inventor's U.S. Pat. No. 3,418,304 discloses a complex of alkyl metal compounds such as $Et_2AlNEt_2$ and Lewis acid salts such as $AlCl_3$ and $MgCl_2$, e.g., $Et_2AlNEt_2.AlCl_3$ as cocatalysts to entirely replace conventional aluminum alkyls, but such complexes are entirely different from the concept of utilizing certain metal amides as catalyst supplements for conventional Ziegler systems with $Et_3Al$ or $Et_2AlCl$ as cocatalysts.

U.S. Pat. No. 3,255,169 discloses a Ziegler catalyst system employing aluminum hydroaminate compounds. Typical of these is $HAl(NHC_2H_5)_2$ which is used as a total substitution for the conventional aluminum alkyl cocatalyst.

Recently, U.S. Pat. No. 3,905,913 has issued disclosing the use of

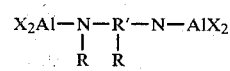

where X is H or halogen, both Rs are hydrocarbon radicals; and R' is a divalent hydrocarbon radical. These compounds are not closely related to those of the invention herein. And they are used as the sole aluminum-containing cocatalyst component.

SUMMARY OF THE INVENTION

The present instant invention relates to unique and novel improved Ziegler type catalyst systems for the conventional alpha-olefin type polymerizations thereby yielding polymers having a high degree of isotactic stereoregularity.

An object of my present invention is to provide improved Ziegler type catalyst systems having a major increase in polymerization activity while being able to control the polymer crystallinity over a wide range, e.g. isotacticity, wherein the catalyst system includes at least one Group IVB-VIII transition metal halide, an alkyl metal cocatalyst selected from the group consisting of $R'_3Y$ or $R'_2YX$ and mixtures thereof and an alkyl metal compound being selected from $R'_2YNR$ and $R'XYNR_2$, wherein R' is selected from the group consisting of $C_1$ to $C_{20}$ primary alkyl, secondary alkyl, tertiary alkyl, neopentyl alkyl, branched alkyl, naphthenic, or aralkyl groups, X is a halide group, R is selected from the group consisting of $C_3$ to $C_{20}$ bulky alkyl groups, cycloalkyl groups, aryl groups, or a cyclic amine structure, and Y is selected from the group consisting of aluminum, gallium and indium.

A further object of my present invention is to provide an improved process for alpha-olefin type polymerizations, wherein the polymerization activity is increased without adversely affecting the crystallinity of the formed polymer.

A still further object of my present invention is to provide an improved Ziegler type catalyst system wherein catalyst poisons are consumed in situ thereby minimizing the formation of atactic type polymers wherein the catalyst poison $R'AlX_2$ is effectively removed from the catalyst thereby making a higher number of active sites.

A still further object is the advantage over the alternative catalysts of being able to use the instant compounds directly with any type of transition metal halide without modification of the commercial catalyst preparation or the polymerization plant.

GENERAL DESCRIPTION

During a Ziegler type alpha-olefin polymerization which employs $TiCl_3$ in combination with $R'_3Y$ or $R'_2YX$, the byproduct $R'YX_2$ is formed on the surface of the $TiCl_3$ thereby acting as a catalyst poison (deactivator), wherein $R'$ selected from the group consisting of $C_1$ to $C_{20}$ primary alkyl, secondary alkyl, tertiary alkyl, neopentyl alkyl, branched alkyl, naphthenic or aralkyl groups, preferably a $C_2$ to $C_4$ alkyl group, X is a halide group, Y is selected from the group consisting of Al, Ga or In.

It has been shown that the addition of small amounts of $EtAlCl_2$ to a $TiCl_3$-$Et_2AlCl$ catalyst system dramatically reduces polymerization rates (Ingberman, et. al., J. Polymer Sci. A4, 2781 (1966)). Since the formation of an active catalyst site during polymerization involves the reaction $R'_2AlCl + TiCl_3 \rightarrow R'AlCl_2 + R'TiCl_2$ on the surface of the $TiCl_3$ crystal, it is apparent that the $R'AlCl_2$ catalyst poison (or deactivator) is always present in such catalyst systems. Likewise for the reaction of $R'_3Al$ with excess $TiCl_3$ is:

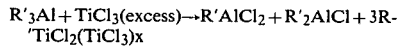

It has been surprisingly found that this catalyst poison $R'AlX_2$ can be effectively removed from the surface of the $TiCl_3$ by the addition of a compound $R'_2YNR_2$ or $R'XYNR_2$ to the $TiCl_3$-$R'_3Al$ or $TiCl_3$-$R'_2AlX$. The $R'_2YNR_2$ reacts selectively with $R'AlX_2$ in two different ways either to remove the $R'AlX_2$ by the formation of mixed dimers:

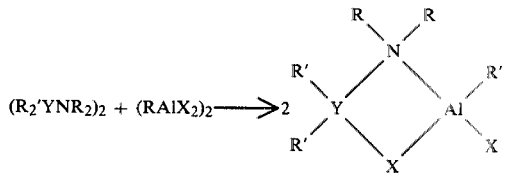

or by transalkylation to regenerate $R'_2AlX$ and to generate $R'XYNR_2$: $R'_2YNR_2 + R'AlX_2 \rightarrow R'XYNR_2 + R'_2AlX$. In the case of $R'XYNR_2$, the $R'AlX_2$ is simply removed by formation of a catalytically inactive mixed dimer. In either case, the $R'AlX_2$ is effectively removed from the catalyst sites, thereby resulting in a higher number of active sites per unit of catalyst volume which is reflected in a large increase in activity. When the amide ($R'_2YNR_2$) of the present instant invention is used in relatively small amounts based on the $R'_3Al$ or $R'_2AlX$, the polymer isotacticity (as measured by heptane insolubles, density, tensile, etc.) is similar to or higher than that obtained with either $R'_3Al$ or $R'_2AlX$ alone. When higher proportions are used relative to $R'_2AlX$ or $R'_3Al$, the polymer becomes less isotactic, but polymerization rates increase to even higher levels. Thus, one can achieve remarkable increases in activity from any $TiCl_3$ or $TiCl_4$ catalyst while simultaneously controlling polymer isotacticity over a wide range. Another advantage the cocatalyst supplement of the invention has over alternative catalysts is that it may be used directly with any type of $TiCl_3$ or $TiCl_4$ presently being used without modification of the commercial catalyst preparation or the polymerization plant.

The amides usable in the invention have the general structures $R'_2AlNR_2$ and $R'XAlNR_2$, wherein $R' = C_1$ to $C_{20}$ hydrocarbyl group such as primary alkyl, secondary alkyl, tertiary alkyl, neopentyl alkyl, branched alkyl, cycloalkyl, or aralkyl, preferably a $C_{1-12}$ alkyl; and $R = C_3$ to $C_{20}$ bulky alkyl, cycloalkyl, aryl or substituted aryl groups, including ring structures such as $R_2Al$ piperidide and $Et_2Al$ pyrrolidide. Hindered amide groups derived from hindered secondary amines are especially preferred because they interact less strongly with the $TiCl_3$ and have greater driving force to form mixed dimers with the $R'AlCl_2$ poison. Such compounds have large, bulky R groups by virtue of branching on the carbons alpha, beta or gamma to the nitrogen. Illustrative examples of R groups include isopropyl, isobutyl, neopentyl, 3,3-diethylhexyl, 2-ethylhexyl, 2-butyl, 2-octyl, 3-pentyl, cyclohexyl, cyclopentyl, 2-methyl-cyclopentyl, 3-ethylcyclohexyl, phenyl, totyl, xylyl, chlorophenyl, naphthyl and mixtures including mixtures in which one R group may be a less bulky saturated group such as a normal alkyl. Also, the two R groups may be part of a cyclic amine structure, such as pyrrolidyl, piperidyl, and the like and their various alkyl substituted derivatives especially when the substituents are on the carbon atoms adjacent to the nitrogen atoms, such as 2,6-diisopropylpiperidide, 2,2,6,6-tetramethylpiperidide, and the like.

The Y group of $R'_2YNR_2$ is selected from the group consisting of aluminum, gallium, or indium, most preferably aluminum.

The ratio of amide to $TiCl_3$ is between about 0.05:1 to 5:1. The lower ratios are used together with "low aluminum" containing $TiCl_3$ to make highly isotactic polymers at high rates. Higher ratios are used with aluminum-containing $TiCl_3$ catalysts such as the commercial $TiCl_3 \cdot 0.33$ $AlCl_3$ catalyst. "Low-aluminum" containing $TiCl_3$ refers to $TiCl_3$ catalysts which have low Al because of method of formation or have had a major portion of the aluminum removed as a result of subsequent reactions.

These new cocatalyst mixtures are useful with any of the crystal modifications of $TiX_3$, with solid solutions of Groups II-III metal salts in $TiX_3$ (also referred to as "cocrystallized" such as $TiCl_3 \cdot nAlCl_3$ or $TiCl_3 \cdot nMgCl_2$, and with $TiX_3$ or $TiX_4$ supported on salts such as $MgCl_2$ or hydroxy-chloride, oxides or other inorganic or organic supports, wherein $X = Cl$ or Br, preferably Cl. Lewis bases, alcohols, carboxylic acids, etc. may also be present. The most preferred crystal structure is delta or pseudo delta, the latter being a mixture of disordered, very small alpha and gamma crystallites. This invention is also useful for increasing the activity and/or stereo-specificity of supported $TiCl_4$ and $TiCl_3$-type catalysts and other supported predominantly trivalent titanium compounds. The $TiCl_3$-type catalysts may be prepared from $TiCl_4$ by any of the reduction and crystallization procedures known in the art ($H_2$, metal, metal hydrides, alkyl, etc.). Low aluminum $TiCl_3$ type catalysts are preferred.

Lewis bases can be employed in combination with the trialkyl metal compound or with the Group IVB to VIII transition metal compound or with both components as long as they do not cause excessive cleavage of metal-carbon bonds or loss of active sites. A wide variety of Lewis bases may be used including such types as tertiary amines, esters, phosphines, phosphine oxides, phosphates (alkyl, aryl), phosphites, hexaalkyl phosphoric triamides, dimethyl sulfoxide, dimethyl formamide, secondary amines, ethers, epoxides, ketones, saturated and unsaturated heterocycles, or cyclic ethers and mixtures thereof. Typical but non-limiting examples are diethyl ether, dibutyl ether, tetrahydrofuran, ethylacetate, methyl p-toluate, ethyl p-anisate, ethyl benzoate, phenyl acetate, amyl acetate, methyl octanoate, acetophenone, benzophenone, triethylamine, tributyl amine, dimethyldecylamine, pyridine, N-methylpiperidine, 2,2,6,6,-tetramethylpiperidine, and the like. Especially useful in combination with the trialkyl metal cocatalyst are Lewis bases whose complexing ability toward the cocatalyst is "hindered" sufficiently by steric and/or electronic effects to cause appreciable dissociation of the trialkyl metal-Lewis base complex under polymerization conditions. Although a wide range of mole ratios may be used, dissociation of the complex as measured on a 1:1 complex is normally in the range of 1–99 mole %, more preferably 5–95%, and most preferably greater than about 10% and less than about 90%. Steric hindrance is achieved by bulky substituents around the heteroatom which reduces the accessibility of the base functionality to the Lewis acid, that is, the trialkyl metal compound. Electronic hindering is obtained by placing electron withdrawing substituents on the heteroatom to reduce the electron density on basic heteroatom. Aromatic substituents are especially useful because they are relatively unreactive toward other catalyst components. Hindered Lewis bases derived from piperidines, pyrrolidines, ketones, tetrahydrofurans, secondary and tertiary aromatic amines and tertiary aliphatic amines are preferred, with the hindered nitrogen bases being most preferred. Non-limiting examples of sterically hindered bases include 2,2,6,6-tetramethylpiperidine, 2,2,5,5,-tetramethylpyrrolidine, 2,2,5,5,-tetramethyltetrahydrofuran, di-tert-butylketone, 2,6-diisopropylpiperidine, ortho-tolyl t-butyl ketone, methyl 2,6-di-tert-butylphenylketone, diisopropylethylamine, t-butyldimethylamine, 6-methyl-2-isopropylpyridine, and the like. Electronically hindered Lewis bases include diphenylamine, diortho-tolylamine, N,N-diethyl-aniline, di-ortho-tolylketone, and the like. Since aromatic substituents are also bulky, some of the electronically hindered bases can also have a steric contribution to the hindrance. Especially preferred hindered amines are 2,2,6,6-tetramethylpiperidine, 2,2,5,5,-tetramethylpyrrolidine and the diarylamines. Completely hindered bases, such as 2,6-di-tertiarybutylpyridine, and the like, which complex the alkyl metal cocatalyst too weakly, are ineffective for improving sterospecificity and are excluded from this invention.

Further increases in activity or stereospecificity may be obtained by premixing the transition metal component with either the amide or the alkyl metal, or both.

The amide effect is obtained with all the usual polymerization conditions. Thus solvent, temperature and monomer concentrations are not critical. Increased activity is obtained with all alpha olefins from ethylene to $C_{10}$ and higher as well as in copolymerizations such as ethylene/α-olefin, ethylene/diolefin, propylene/α-olefin, propylene/diolefin and ethylene/α-olefin/diene copolymerizations. The amount of alkyl metal cocatalyst is usually in the range of 0.1:1 to 20:1, preferably about 0.5:1 to 10:1 mole ratio of alkyl metal to transition metal compound. It is feasible using the hindered amides and hindered Lewis bases to employ higher mole ratios, up to 200:1 or higher, to achieve higher activity at high stereospecificity. The most preferred mole ratios with the hindered components is in the range 5:1 to 200:1 alkyl metal plus amide to transition metal compound.

The concept of the invention can be restated as follows. Two types of alkyl metal compounds have been found to be effective for greatly increasing the activity of Ziegler catalysts, especially for propylene polymerization. These are alkyl aluminum dialkylamides and alkyl chloroaluminum dialkyl amides. The amides most preferably are sterically hindered. Both types are believed to operate by selectively scavenging the $R'AlCl_2$ poison from the catalyst through the formation of mixed dimers. The dialkylaluminum additives are preferred because they regenerate the desirable $R_2AlCl$ by reaction with $RAlCl_2$. However, the corresponding alkyl chloroaluminum amides are also effective additives for simply scavenging $RAlCl_2$. These latter have the advantage over the dialkylaluminum types in that they have little, if any, polymerization activity so that the amounts used need not be so carefully controlled.

When the dialkylaluminum amide additives are used in excess over the amount of $R'AlCl_2$ produced by the catalyst reactions, they are capable of forming active sites which yield lower isotacticity polymer. Therefore, these additives are preferably used in about 5 to 50 mole % based on $TiCl_3$ in the absence of extrinsic sources of $R'AlCl_2$. About 50–100 mole % should be used when added $R'AlCl_2$ plus that formed by reacting $R'_2AlCl$ with $AlCl_3$ in the titanium component is in the overall polymerization system. The best results are obtained when the molar amount of additive is approximately equal to the molar amount of $R'AlCl_2$ produced before and during polymerization.

The alkyl groups on the aluminum compound containing about 2 to 12 carbons per alkyl group all produce higher activity catalysts. However, for propylene and higher alpha olefins, polymer isotacticity decreases with increasing alkyl chain length. Therefore, $C_2$ to $C_4$ alkyl groups are preferred when isotactic polymers are desired.

The halide group in the aluminum components of the catalyst is preferably chloride or bromide, with chloride being most preferred.

The alkyl groups attached to the amide nitrogen are preferably attached to secondary or tertiary carbons to achieve sufficient steric hindrance. Primary alkyls are useful only when there is sufficient branching on the carbon atom beta or gamma to the nitrogen. Open chain as well as cyclic groups may be used. The most preferred groups are isopropyl, t-butyl and cyclohexyl groups.

The additives appear to be useful with any Group IVB-VIIB Ziegler transition metal catalyst which produces $R'AlCl_2$ poison by reaction with aluminum alkyls. Trivalent titanium and vanadium chlorides are preferred with those having low aluminum content being most preferred. The additives also appear to be generally useful for any monomer and mixtures of monomers.

When the dialkylaluminum amide additives are used in combination with aluminum trialkyl compounds, the preferred transition metal component is supported $TiCl_3$ or $TiCl_4$ on salts such as $MgCl_2$ or hydroxychloride in which at least one Lewis base is also present. An excess of amide over the aluminum trialkyl may be used with supported $TiCl_4$ catalysts to further increase iostacticity. Thus the mole ratio of aluminum trialkyl to amide may be about 1 to 50 to about 50 to 1, preferably about 1 to 10 to 10 to 1. The molar ratio of the trialkyl metal compound to the supported transition metal compound is about 0.5 to 1 to about 200 to 1 or higher, more preferably about 5 to 1 to about 100 to 1. Lewis bases are normally added in less than stoichiometric amounts based on the trialkyl metal cocatalyst or the nitrogen-containing metal alkyl compound, preferably about 0.1 to 1 to about 1 to 1. However, the hindered Lewis bases may be added in greater than equimolar amounts, from about 0.1 to 1 up to about 10:1 mole ratio, to obtain higher stereospecificity without a major loss of activity which would occur with unhindered bases.

DETAILED DESCRIPTION OF THE PREFERRED EMBODIMENTS

The advantages of the unique and novel catalysts system, the process for the alpha-olefin polymerization and the unique and novel compositions of the mixed dimers of the present instant invention can be more readily appreciated by reference to the following examples and tables.

EXAMPLE I

A series (A-G) of polymerization runs was carried out in a 1 liter baffled resin flask fitted with an efficient reflux condenser and a high speed stirrer. In a standard procedure for propylene polymerizations, 475 ml n-heptane (<1 ppm water) containing 10 mmole $Et_2AlCl$ (1.20 g) was charted to the reactor under dry $N_2$ heated to reaction temperature (65° C.) and saturated with pure propylene at 765 mm pressure. The $TiCl_3$ (1.00 g) (6.5 mmole) was charged to a catalyst tube containing a stopcock and a rubber septum cap. Polymerization started when the $TiCl_3$ was rinsed into the reactor with 25 ml n-heptane from a syringe. Propylene feed rate was adjusted to maintain an exit gas rate of 200-500 cc/min at a pressure of 765 mm. After one hour at temperature and pressure, the reactor slurry was poured into one liter isopropyl alcohol, stirred 2-4 hours, filtered, washed with alcohol and vacuum dried.

The $TiCl_3$ was prepared by reduction of $TiCl_4$ with $Et_2AlCl$ followed by treatment with diisopentyl ether and $TiCl_4$ under controlled conditions, yielding a high surface area delta $TiCl_3$ having low aluminum content (hereinafter "low aluminum" $TiCl_3$).

In Runs B-E, the diethyl aluminum diisopropylamide ($Et_2AlN(iPr)_2$) was added to the reactor together with the $Et_2AlCl$. The results summarized in Table I following show that activity increased sharply up to 1 mmole amide, then more slowly up to 3 mmoles amide. The percent heptane insolubles (also called isotacticity index) remained essentially constant, then decreased slightly at 3 mmoles amide.

Runs F and G show that still large increases in activity are obtained by premixing the $TiCl_3$ with either the amide or the $Et_2AlCl$.

Thus, the addition of only 5-30 mole % amide based on $Et_2AlCl$, or about 7-50 mole % based on $TiCl_3$, resulted in 25-250 percent increase in polymerization rate over Control Run A.

The increased activity was not due simply to higher dialkyl aluminum concentration because 13 mmoles $Et_2AlCl$ gave only 34.1 activity.

TABLE I

| | PROPYLENE POLYMERIZATION $Et_2AlN(iPr)_2$ Additive | | |
|---|---|---|---|
| Run | $Et_2AlN(iPr)_2$ Mmoles | Rate g/g $TiCl_3$/hr | % Heptane Insolubles[a] |
| A (Control) | 0 | 34.2 | 95.7 |

TABLE I-continued

| | PROPYLENE POLYMERIZATION $Et_2AlN(iPr)_2$ Additive | | |
|---|---|---|---|
| Run | $Et_2AlN(iPr)_2$ Mmoles | Rate g/g $TiCl_3$/hr | % Heptane Insolubles[a] |
| B | 0.5 | 48.2 | 94.7 |
| C | 1 | 52.2 | 93.3 |
| D | 2 | 51.8 | 94.9 |
| E | 3 | 54.2 | 92.0 |
| F | 2[b] | 65.2 | 94.6 |
| G | 3[c] | 83.2 | 91.7 |

[a]Insoluble in boiling n-heptane based on total product, including alcohol-solubles minus catalyst.
[b]Mixed $TiCl_3$ + amide in 12 ml n-heptane, 50° C. 15 min. before charging to reactor containing the $Et_2AlCl$.
[c]Mixed $TiCl_3$ + $Et_2AlCl$ in 10 ml n-heptane, 25° C. 30 min. before charging to reactor containing the $Et_2AlN(iPr)_2$.

The results as shown by the above data are that the technique of the invention can be used to more than double activity without a significant decrease in the heptane solubles of the resulting polymer.

EXAMPLE II

The procedure of Example I was repeated for additional Runs H-N except that diethyl aluminum dicyclohexyl-amide ($Et_2AlN(cyC_6)_2$) was used instead of the diisopropylamide. Commercial delta cocrystallized $TiCl_3.0.33AlCl_3$ (Stauffer AA grade) (1.00 g) (5 mmoles) was used instead of $TiCl_3$. (This commercial $TiCl_3$ catalyst has lower activity than the "low-aluminum $TiCl_3$ catalyst" used in Example I). By "co-crystallized" it is meant that the $AlCl_3$ is an integral part of the crystal lattice of the $TiCl_3$. The results are summarized as follows in Table II.

TABLE II

| | PROPYLENE POLYMERIZATION $Et_2AlN(cyC_6)_2$ Additive | | |
|---|---|---|---|
| Run | $EtAlN(cyC_6)_2$ Mmoles | Rate g/g $TiCl_3$ AA/hr | % Heptane Insolubles[a] |
| H (Control) | 0 | 20.9 | 93.7 |
| I | 0.30 | 23.7 | 94.0 |
| J | 0.625 | 28.5 | 93.8 |
| K | 2 | 36.8 | 89.9 |
| L | 3 | 40.0 | 84.7 |
| M | 2[b] | 32.3 | 93.0 |
| N | 2[c] | 30.9 | 94.0 |

[a]Same as [a] in Table I.
[b]Premixed $TiCl_3 . 0.33 AlCl_3$ + amide in 10 ml n-heptane, 25° C., 30 min. before charging to reactor containing the $Et_2AlCl$.
[c]Premixed $TiCl_3 . 0.33 AlCl_3$ + $Et_2AlCl$ in 5 ml n-heptane, 25° C., 30 min. before charging to reactor containing the $Et_2AlN(cyC_6)_2$.

The results in Table II show that activity nearly doubled upon addition of 3 mmoles amide (60 mole % on $TiCl_3$). In contrast to the results in Example I using an essentially aluminum-free $TiCl_3$, the polypropylene isotacticity decreased substantially with increasing amounts of amide, but at least a 40% increase of activity could be obtained without loss of isotacticity.

Runs M and N show that premixing either the amide or the $Et_2AlCl$ with $TiCl_3.0.33AlCl_3$ resulted in a smaller activity increase than was obtained without premixing (Run K), but the heptane insolubles were raised back up to the Control (Run H). Thus, with premixing an approximately 60% increase in activity could be obtained without loss of isotacticity.

EXAMPLE III

The procedure of Example II, Run K, was repeated except that 2 mmoles diethyl aluminum diethylamide was added instead of dicyclohexylamide. Polymerization rate was 24.9 g/g TiCl$_3$.0.33AlCl$_3$/hr and heptane insolubles was 94.1 percent. Therefore, the unhindered diethylamide was much less effective than the hindered dicyclohexylamide in increasing catalyst activity.

EXAMPLE IV

The procedure of Example I, Runs B and D, was repeated using diethyl aluminum dicyclohexylamide with similar results (40.3 and 47.6 g/g TiCl$_3$/hr vs 34.2 for the Control).

EXAMPLE V

The procedure of Example I, Run E was followed except that brown TiCl$_3$ (most beta) was used (prepared by mixing Et$_2$AlCl+TiCl$_4$ in n-hexane at $-30°$ C. and heating to 65° C. for 1 hr, filtered, washed with n-hexane and vacuum dried). Polymerization rate increased to 41.4 g/g TiCl/hr from 18.0 for the Control run performed in the absence of Et$_2$AlN(iPr)$_2$.

EXAMPLE VI

A titanium catalyst supported on MgCl$_2$ was prepared by ball milling 20 g anhydrous MgCl$_2$, six ml ethylbenzoate and 3 ml methylpolysiloxane for 100 hr at room temperature. The solid was treated with an equimolar amount (based on MgCl$_2$) of 1 M AlEt$_3$ at 100° C. for 1.5 hours, filtered and washed with heptane. This product was treated with excess 40% TiCl$_4$ in heptane at 65° C., 2 hours, then with 90% TiCl$_4$, 65° C., 1.5 hours, washed thoroughly with heptane and vacuum dried, yielding a brown powder containing both TiCl$_3$ and TiCl$_4$. The procedure of Example I, Runs A (Control) and D were followed except that 1 g of the supported catalyst was used in place of TiCl$_3$. Polymerization rate in the presence of amides increased to 75.7 from 21.1 in the Et$_2$AlCl Control. Heptane insolubles increased to 46.4 from 35.8.

EXAMPLE VII

Polymerization runs were made in a stirred autoclave at 100 psi propylene pressure plus hydrogen for molecular weight control using pentane diluent, 60° C., 2 hours. The Control run using 10 mmoles Et$_2$AlCl/5 mmoles TiCl$_3$.0.33AlCl$_3$ (Stauffer AA grade) produced 495 g polypropylene/g TiCl$_3$. Repeating the same run but also adding 2.5 mmoles Et$_2$AlN(iPr)$_2$ increased catalyst efficiency to 612 g/g TiCl$_3$.

EXAMPLE VIII

Ethylene was polymerized following the procedure of Example I, Run A. During the first 25 minutes, the ethylene absorption rate decreased from 370 cc/min to 330 cc/min. At this point, 3 mmoles Et$_2$AlN(iPr)$_2$ in 10 ml n-heptane was added. The ethylene absorption rate gradually increased to 360 cc/min during the next 35 minutes. Thus, the rate of ethylene polymerization is also increased by the addition of a dialkylaluminum amide, but the effect is much smaller than for propylene polymerization.

EXAMPLE IX

An ethylene-propylene copolymerization was carried out in a similar manner to the procedure of Example VIII except that only 0.5 g TiCl$_3$ plug 5 mmoles Et$_2$AlCl was used. The monomer feed rates were set at 150 cc/min ethylene and 1350 cc/min propylene. During the first 20 minutes, the absorption rate was 550 cc/min. At this point, 1.5 mmoles Et$_2$AlN(iPr)$_2$ in 10 ml n-heptane was added and the absorption rate increased to 750 cc/min for the next 15 min.

EXAMPLE X

The procedure of Example I was followed for a series of Runs T'-X' and AA except that halogenated aluminum amides were used together with various alkyl aluminum compounds. The preparation of low aluminum TiCl$_3$ prepared by the technique described in Example I was used. The results are summarized as follows in Table IV.

TABLE IV

| Run | Mmoles R$_n$AlX$_{3-n}$ | Mmoles RXAlN(iPr)$_2$ | Relative Activity | % Heptane Insoluble |
|---|---|---|---|---|
| Control | 10 Et$_2$AlCl | — | 100 | 95.6 |
| T' | — | 5 EtClAlN(iPr)$_2$ | 8.2 | — |
| U' | 5 EtAlCl$_2$ | 5 EtClAlN(iPr)$_2$ | 8.7 | — |
| V' | 5 Et$_2$AlCl | 5 EtClAlN(iPr)$_2$ | 155 | 94.0 |
| W' | 5 Et(C$_{12}$)AlCl | 5 EtClAlN(iPr)$_2$ | 180 | 83.2 |
| X' | 5 (C$_{12}$)$_2$AlCl | 5 EtClAlN(iPr)$_2$ | 86 | 54.2 |
| AA | 5 AlEt$_3$ | 5 EtClAlN(iPr)$_2$ | 576 | 62.0 |
| BB | 10 Et$_2$AlCl | 2 EtClAlN(iPr)$_2$ | 157 | 93.9 |

The data from these experiments show the following:
(1) Aluminum amides containing less than two alkyl groups are inactive alone (Run T) or when mixed with RAlCl$_2$ (Run U), because no R$_2$AlCl is present for active site formation.
(2) Alkyl chloroaluminum amides increase the activity of catalysts containing R$_2$AlCl (Runs V', W' and BB).
(3) Long chain alkyl groups in the R$_2$AlCl component decrease heptane insolubles (Runs W' and X').
(4) AlEt$_3$ yields very high activity in the presence of the amide (Run AA) but heptane insolubles are substantially less than in the Et$_2$AlCl control.
(5) Increasing the ratio of Et$_2$AlCl: amide from 5:5 (Run V) to 10:2 (Run BB) gave no additional improvement in activity or heptane insolubles.

EXAMPLE XI

The procedure of Example I, Run B, was followed except that aluminum triethyl was used in combination with the diethyl aluminum diisopropylamide and the transition metal catalyst (0.2 g) was TiCl$_4$ supported on MgCl$_2$. The catalyst was made by ball milling 5 moles MgCl$_2$ with 1 mole ethylbenzoate for one day, adding 1 mole TiCl$_4$ and milling 3 days, then treating with neat TiCl$_4$ at 80° C., 2 hours, washing with heptane and vacuum drying. The catalyst contained 3.44% Ti.

TABLE V

| Run | Mmoles AlEt$_3$ | Mmoles Et$_2$AlNiPr$_2$ | Rate g/g Cat/hr | % Heptane Insolubles |
|---|---|---|---|---|
| Control | 1 | 0 | 244 | 83.1 |
| A | 1 | 0.2 | 268 | 83.8 |
| B | 1 | 1 | 299 | 87.3 |
| C | 0 | 1 | 0 | — |
| D | 0.25 | 1 | 20 | 96.8 |
| E | 1 | 3 | 267 | 90.4 |

The amide additive increased both activity and heptane insolubles with increasing concentrations (Runs A, B and E vs. control) although the amide was inactive alone (Run C). Keeping the amide concentration constant and decreasing the AlEt$_3$ concentration (4 amide/1 AlEt₃) reduced activity but gave very high heptane insolubles (Run D vs. Run B).

EXAMPLE XII

The procedure of Example XI was followed except that t-Bu₂AlEt was used instead of AlEt₃.

TABLE VI

| Run | Mmoles t-Bu₂AlEt | Mmoles Et₂AlNiPr₂ | Rate g/g Cat/hr | % Heptane Insolubles |
|---|---|---|---|---|
| Control | 1 | 0 | 248 | 93.8 |
| F | 1 | 1 | 265 | 93.8 |
| G | 1 | 1.2 | 245 | 94.4 |
| H | 1 | 1.5 | 258 | 94.5 |

An excess of amide over the aluminum trialkyl increased both activity and heptane insolubles over the control run.

EXAMPLE XIII

The procedure of Example XI, Runs B and E, was followed except that Et₂AlNEt₂ was used in place of Et₂AlNiPr₂. Polymerization rates were 230 and 246, respectively, no improvement over the control rate of 244. Heptane insolubles were 84.5 and 84.9, essentially unchanged from the control 83.1%. Comparison of these runs with Example IX, Runs B and E, show that small, non-hindered alkyl groups attached to the amide nitrogen are not effective whereas bulky groups, such as isopropyl, increase both activity and stereospecificity.

EXAMPLE XIV

A new preparation of supported catalyst was used which contained 3.16% Ti.

TABLE VII

| Run | Mmoles AlEt₃ | Mmoles Et₂AlNiPr₂ | Mmoles EB | Rate | % HI |
|---|---|---|---|---|---|
| Control | 1 | 0 | 0 | 506 | 81.6 |
| I | 1 | 1 | 0 | 468 | 85.4 |
| J | 1 | 1 | 0.1 | 249 | 93.9 |
| K | 1 | 1 | 0.2 | 140 | 97.0 |
| L | 1 | 1.2 | 0.2 | 166 | 96.4 |
| M | 1 | 3 | 0.2 | 282 | 92.2 |

These experiments show that small amounts of a Lewis base added to the cocatalyst system result in a major improvement in the stereospecificity while still retaining good activity.

EXAMPLE XV

The procedure of Example XIV was followed except that hindered amides and a highly hindered Lewis base were used.

TABLE VIII

| Run | Mmoles AlEt₃ | Mmoles Amide | Mmoles Amine[3] | Rate | % HI |
|---|---|---|---|---|---|
| N | 0.5 | 1.5 A[1] | 0.5 | 169 | 98.1 |
| O | 0.88 | 3.12 B[2] | 0.88 | 343 | 98.4 |
| P | 0.64 | 1.36 B[2] | 0.14 | 387 | 95.8 |

[1]A = Et₂AlN(cyC₆H₁₁)₂
[2]B = Et₂Al-2,2,6,6-tetramethylpiperidide
[3]Amine = 2,2,6,6-tetramethylpiperidine.

Comparison with the results in Table VII shows that the combination of hindered amide and hindered amine increased both activity and stereospecificity to higher levels than were achieved with the unhindered amides and bases.

EXAMPLE XVI

The procedure of Example XV was followed except that an unhindered Lewis base (ethylbenzoate=EB) was also added together with the cocatalysts. A different preparation of supported catalyst was used which contained only 1.75% titanium.

TABLE IX

| Run | Mmoles AlEt₃ | Mmoles Amide[2] | Mmoles Amine[2] | Mmoles EB | Rate | % HI |
|---|---|---|---|---|---|---|
| Control | 0.4[1] | 0 | 0 | 0 | 963 | 49.0 |
| Q | 0.44 | 1.56 | 0.44 | 0.2 | 279 | 98.6 |

[1]0.08 g. Catalyst
[2]B = Et₂Al-2,2,6,6-tetramethylpiperidide.

The results in Run Q show that very high stereospecificity (98.6% heptane insolubles) was obtained by the use of a dialkyl aluminum amide and two different Lewis bases as modifiers for the trialkyl aluminum. The results are especially striking since the control run shows that the catalyst gave very low stereospecificity (49% HI) in the absence of cocatalyst modifiers.

EXAMPLE XVII

The procedure of Example XIV, Run I, was followed except that a diarylamide, diethyl aluminum di-orthotolylamide, and a new preparation of the same type of supported catalyst which contained 3.38% Ti were used. The polymerization rate was 309 g/g. catalyst/hr. and the % HI=93.4. Comparison with Example XIV control and Run I shows that the diarylamide was more effective than the diisopropylamide in increasing stereospecificity.

Since many modifications and variations of this invention may be made without departing from the spirit or scope of the invention thereof, it is not intended to limit the spirit or scope thereof to the specific examples thereof.

What is claimed is:

1. A catalyst composition which comprises a mixture of:
    (a) at least one supported Group IVB to VIII transition metal halide;
    (b) a trialkyl metal cocatalyst, said trialkyl metal cocatalyst having the structure of R'₃Y wherein R' is selected from the group consisting of C₁ to C₂₀ primary alkyl, secondary alkyl, tertiary alkyl, neopentyl alkyl, branched alkyl, naphthenic or aralkyl groups and Y is selected from the group consisting of aluminum, gallium and indium;
    (c) a nitrogen-containing metal alkyl compound, the structure of said nitrogen-containing metal alkyl compound being selected from the group consisting of

R'₂YNR₂ or

R'XYNR₂ wherein Y is selected from the group consisting of Al, Ga and In, X is a halide and R' is a C₁ to C₂₀ primary alkyl, secondary alkyl, tertiary alkyl, neopentyl alkyl, branched alkyl, naphthenic or aralkyl group and R is selected from the group consisting of C₃ to C₂₀ bulky alkyl, cycloalkyl, aryl, the proviso that the two R groups can be taken with N to form a pyrrolidyl or piperidyl and the alkyl substituted derivatives of pyrrolidyl and piperidyl, said compound being in a mole ratio of about 0.5 to about 200 of said compound to said transition metal compound, and (d) at least one Lewis base said Lewis base not causing excessive cleavage of metal-carbon bonds or loss of active sites.

2. The composition of claim 1 wherein Y is aluminum.

3. The composition of claim 1 wherein said trialkyl metal cocatalyst is a trialkyl aluminum cocatalyst at a molar ratio of about 1 to 50 to about 50 to 1 based on said nitrogen containing metal alkyl compound.

4. The composition of claim 1 wherein said nitrogen containing metal alkyl compound is diethylaluminum diisopropylamide.

5. The composition of claim 1 wherein said nitrogen containing metal alkyl compound is diethylaluminum dicyclohexylamide.

6. The composition of claim 1 wherein said transition metal compound is selected from the group consisting essentially of $TiCl_3$ on a support and $TiCl_4$ on a support.

7. The composition of claim 1 wherein said support is $MgCl_2$.

8. The composition of claim 1 wherein said Lewis base is selected from the group consisting of amines, esters, phosphines, ethers, and amides.

9. The composition of claim 1 wherein said Lewis base is an ester.

10. The composition of claims 4 or 5 wherein said Lewis base is ethyl benzoate.

11. The composition of claim 1 wherein said Lewis base is hindered.

12. The composition of claim 1 wherein said Lewis base is selected from the group consisting of sulfoxides, phosphine oxides, phosphates, phosphites, epoxides and saturated and unsaturated heterocycles.

13. The composition of claim 11 wherein said Lewis base is selected from the group consisting of piperidines, pyrrolidines, ketones, tetrahydrofurans, secondary and tertiary aliphatic and aromatic amines.

14. The composition of claim 1 wherein said nitrogen containing metal alkyl compound is diethylaluminum 2,2,6,6-tetramethylpiperidide.

15. The composition of claim 1 wherein said nitrogen containing metal alkyl compound is diethyl aluminum diorthotolyl amide.

16. The composition of claim 1 wherein said R groups are aryl.

* * * * *